United States Patent
Chen et al.

(10) Patent No.: US 8,269,158 B2
(45) Date of Patent: Sep. 18, 2012

(54) SENSING SYSTEM AND METHOD FOR OBTAINING POSITION OF POINTER THEREOF

(75) Inventors: Hsin-Chia Chen, Hsinchu (TW); Tzung-Min Su, Hsinchu (TW); Chih-Hung Lu, Hsinchu (TW); Cho-Yi Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 547 days.

(21) Appl. No.: 12/557,451

(22) Filed: Sep. 10, 2009

(65) Prior Publication Data
US 2010/0090950 A1 Apr. 15, 2010

Related U.S. Application Data

(63) Continuation-in-part of application No. 12/422,191, filed on Apr. 10, 2009, which is a continuation-in-part of application No. 12/249,222, filed on Oct. 10, 2008, now Pat. No. 7,689,381.

(30) Foreign Application Priority Data

Jun. 17, 2009 (TW) .............................. 98120274 A

(51) Int. Cl.
*G06F 15/00* (2006.01)
(52) U.S. Cl. .................................... 250/203.1; 702/151
(58) Field of Classification Search ............... 250/203.1; 702/150–153; 345/157–158, 173; 382/312; 178/18.09
See application file for complete search history.

(56) References Cited

U.S. PATENT DOCUMENTS

| | | | |
|---|---|---|---|
| 4,507,557 A | 3/1985 | Tsikos | |
| 4,782,328 A | 11/1988 | Denlinger | |
| 5,525,764 A | 6/1996 | Junkins et al. | |
| 6,036,189 A * | 3/2000 | Gomez et al. | 273/118 R |
| 6,335,724 B1 | 1/2002 | Takekawa et al. | |
| 6,498,602 B1 | 12/2002 | Ogawa | |
| 6,803,906 B1 | 10/2004 | Morrison et al. | |
| 6,954,197 B2 | 10/2005 | Morrison et al. | |
| 7,109,978 B2 * | 9/2006 | Gillespie et al. | 345/173 |
| 7,232,986 B2 | 6/2007 | Worthington et al. | |
| 8,167,698 B2 | 5/2012 | Van De Wijdeven et al. | |
| 2005/0078095 A1 | 4/2005 | Ung et al. | |
| 2005/0128190 A1 | 6/2005 | Ryynanen | |
| 2005/0243070 A1* | 11/2005 | Ung et al. | 345/176 |
| 2005/0248540 A1 | 11/2005 | Newton | |
| 2007/0089915 A1 | 4/2007 | Ogawa et al. | |
| 2009/0090569 A1* | 4/2009 | Lin | 178/18.09 |
| 2011/0095977 A1 | 4/2011 | Ung | |

* cited by examiner

*Primary Examiner* — Seung C Sohn
(74) *Attorney, Agent, or Firm* — Chun-Ming Shih

(57) ABSTRACT

In a sensing system and a method for obtaining a position of a pointer, the sensing system includes a sensing area, a reflective mirror, an image sensor and a processing circuit. The reflective mirror is configured for generating a mirror image of a pointer when the pointer approaches the sensing area. The image sensor is configured for sensing the pointer and the mirror image thereof when the pointer approaches the sensing area. When the pointer approaches the sensing area, the processing circuit calculates a coordinate value of the pointer according to an image sensed by the image sensor and a predetermined size of the pointer. The pointer forms an imaginary orthographic projection in the sensing area, the processing circuit regards the imaginary orthographic projection as a round projection, and a radius of the round projection is the predetermined size.

12 Claims, 14 Drawing Sheets

SENSING SYSTEM AND METHOD FOR OBTAINING POSITION OF POINTER THEREOF

CROSS-REFERENCES

This application is a continuation-in-part of U.S. application Ser. No. 12/422,191 filed on Apr. 10, 2009, which is a continuation-in-part of U.S. application Ser. No. 12/249,222 filed on Oct. 10, 2008 now U.S. Pat. No. 7,689,381, and this application claims the benefit of Taiwan application Ser. No. 098120274, filed on Jun. 17, 2009.

BACKGROUND

1. Field of the Invention

The present invention relates to the technology of the touch control field, and more particularly to a sensing system and a method for obtaining a position of a pointer.

2. Description of the Related Art

FIG. 1 is a three dimensional view of a conventional sensing system. Referring to FIG. 1, the sensing system 100 is configured for sensing a position of a pointer 102. The sensing system 100 comprises a reflective mirror 104, light-reflecting elements 106 and 108, an image sensor 110 and a processing circuit 112. The reflective mirror 104, the light-reflecting elements 106 and 108, and the image sensor 110 are all disposed on a same plane 114. The plane 114 may be a whiteboard. In addition, a rectangular area indicated by a label 116 is used as a sensing area of the sensing system 100.

The light-reflecting elements 106 and 108 are both configured for reflecting light to the sensing area 116, and the reflective mirror 104 is configured for generating a mirror image of the sensing area 116. The reflective mirror 104 may be a plane mirror having a mirror surface 118, and the mirror surface 118 faces towards the sensing area 116. The image sensor 110 is disposed at a corner of the sensing area 116, and has a sensing range covering all of the sensing area 116. The processing circuit 112 is electrically coupled to the image sensor 110 for calculating the position of the point 102 according to an image sensed by the image sensor 110.

FIG. 2 is an explanatory view for describing an operation mode of the sensing system 100. As shown in FIG. 2, a portion below a broken line 202 briefly illustrates a part of the sensing system 100, which can be mirrored by the mirror surface 118; and a portion above the broken line 202 is a mirror image of the part of the sensing system 100, which is generated by the mirror surface 118 mirroring the part of the sensing system 100. In FIG. 2, an object indicated by a label 106' is a mirror image of the light-reflecting element 106, an object indicated by a label 108' is a mirror image of the light-reflecting element 108, an object indicated by a label 110' is a mirror image of the image sensor 110, an area indicated by a label 116' is a mirror image of the sensing area 116, and an object indicated by a label 102' is a mirror image of the pointer 102. Thus the image sensor 110 can sense the pointer 102 along a sensing route 204, and also can sense the mirror image 102' of the pointer 102 along a sensing route 206.

FIG. 3 is a schematic view of the image sensed by the image sensor 110 as shown in FIG. 2. In FIG. 3, a label 300 represents an image-sensing window of the image sensor 110. A diagonal area indicated by a label 302 is a bright zone with high luminance formed on the image via reflecting the light by the light-reflecting element 106 and the reflective mirror 104. The bright zone 302 is a main sensing area. A label 304 represents a dark mark caused by the pointer 102, and a label 306 represents another dark mark caused by the mirror image 102' of the pointer 102. Therefore, the processing circuit 112 can further calculate the position of the pointer 102 according to positions of the dark marks 304 and 306 in the image-sensing window 300. A relevant calculating method thereof is disclosed in the U.S. patent application Ser. No. 12/249,222 which claimed the priority of Taiwan Patent application No. 097126033.

However, the sensing system 100 has a disadvantage, which will be described in FIG. 4. FIG. 4 is another explanatory view for describing another operation method of the sensing system 100. As shown in FIG. 4, when the pointer 102 approaches a periphery 192 of the sensing area 116, although the image sensor 110 still can sense the pointer 102 along a sensing route 402 and sense the mirror image 102' of the pointer 102 along a sensing route 404, the image sensed by the image sensor 110 may only have a single dark mark appeared therein, which will be described in FIG. 5, since the sensing routes 402 and 404 are too close.

FIG. 5 is a schematic view of the image sensed by the image sensor 110 as shown in FIG. 4. As shown in FIG. 5, the dark mark indicated by a label 502 cannot be determined to be the dark mark caused by the pointer 102 or the dark mark caused by the mirror image 102' of the pointer 102. Thus the sensing system 100 cannot calculate the position of the pointer 102.

BRIEF SUMMARY

The present invention relates to a sensing system, which can calculate a position of a pointer no matter where the pointer is located in a sensing area.

The present invention also relates to a method for obtaining a position of a pointer, which is adapted to the sensing system.

A sensing system in accordance with an exemplary embodiment of the present invention is provided. The sensing system comprises a sensing area, a reflective mirror, an image sensor and a processing circuit. The reflective mirror is configured for generating a mirror image of a pointer when the pointer approaches the sensing area. The image sensor is configured for sensing the pointer and the mirror image thereof when the pointer approaches the sensing area. When the pointer approaches the sensing area, the processing circuit calculates a coordinate value of the pointer according to an image sensed by the image sensor and a predetermined size of the pointer. The pointer forms an imaginary orthographic projection in the sensing area, the processing circuit regards the imaginary orthographic projection as a round projection, and a radius of the round projection is the predetermined size.

A method for obtaining a position of a pointer in accordance with another exemplary embodiment of the present invention is provided and is adapted to a sensing system. The sensing system comprises a sensing area, a reflective mirror and an image sensor. The reflective mirror is configured for generating a mirror image of the pointer when the pointer approaches the sensing area, and the image sensor is configured for sensing the pointer and the mirror image thereof when the pointer approaches the sensing area. The method is firstly determining whether the pointer approaches the sensing area; and then calculating a coordinate value of the pointer according to an image sensed by the image sensor and a predetermined size of the pointer when determining the pointer approaches the sensing area. The pointer forms an imaginary orthographic projection in the sensing area, the imaginary orthographic projection is regarded as a round projection, and a radius of the round projection is the predetermined size.

In an exemplary embodiment of the present invention, when an image corresponding to the pointer and an image corresponding to the mirror image of the pointer sensed by the image sensor partially overlap, the image sensor senses a periphery of the pointer along a first sensing route, and the image sensor senses a periphery of the mirror image of the pointer along a second sensing route. The pointer and the mirror image thereof are between the first sensing route and the second sensing route. The step of calculating the coordinate value of the pointer comprises: determining linear equations of the first sensing route and the second sensing route, defining a current axes coordinate of the pointer as a first unknown coordinate, and defining a current axes coordinate of the mirror image of the pointer as a second unknown coordinate; obtaining a first equation according to the first unknown coordinate, the linear equation of the first sensing route and the predetermined size, wherein the first equation describes that a distance between the first unknown coordinate and the first sensing route is the predetermined size; obtaining a second equation according to the second unknown coordinate, the linear equation of the second sensing route and the predetermined size, wherein the second equation describes that a distance between the second unknown coordinate and the second sensing route is the predetermined size; and calculating a value of the first unknown coordinate according to the first equation and the second equation as the coordinate value of the pointer.

The present invention calculates the coordinate value of the pointer according to a predetermined size of the pointer when the images partially overlap. The predetermined size is a radius of a round projection, which is obtained by regarding an imaginary orthographic projection of the pointer formed in the sensing area as the round projection. In the present invention, if determining the linear equations of the first sensing route and the second sensing route, defining the current axes coordinate of the pointer as the first unknown coordinate and defining the current axes coordinate of the mirror image of the pointer as the second unknown coordinate can be performed, a first equation can be obtained according to the first unknown coordinate, the linear equation of the first sensing route and the predetermined size, and a second equation can also be obtained according to the second unknown coordinate, the linear equation of the second sensing route and the predetermined size. The first equation describes that the distance between the first unknown coordinate and the first sensing route is the predetermined size, and the second equation describes that the distance between the second unknown coordinate and the second sensing route is the predetermined size. Then the value of the first known coordinate can be calculated according to the first equation and the second equation as the coordinate value of the pointer. Therefore, the present invention can solve the problem of the conventional sensing technology which can not calculate the coordinate value of the pointer when the images partially overlap.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
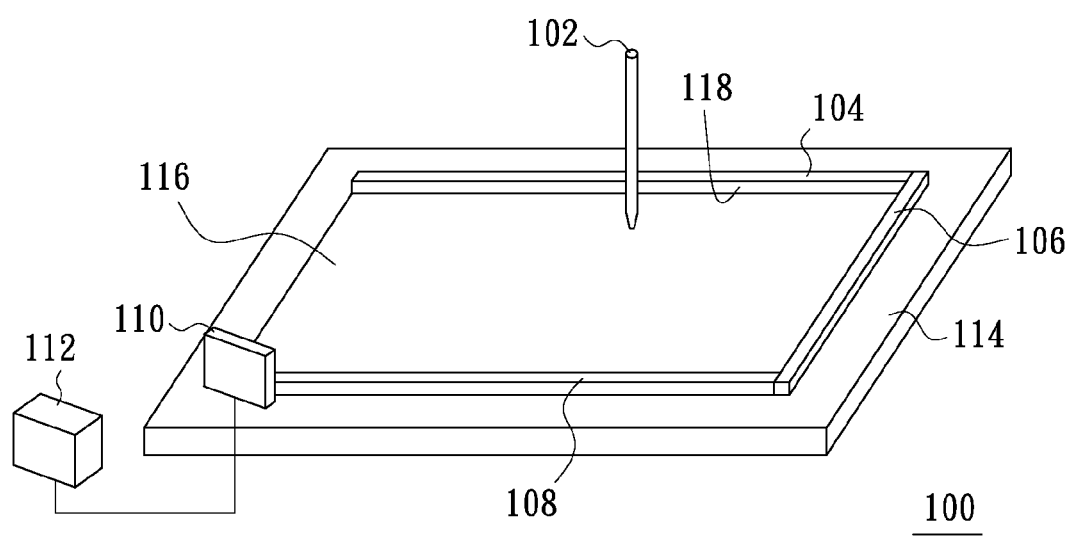
FIG. 1 is a three dimensional view of a conventional sensing system.

The following will employ the sensing system as shown in FIG. 1 again to describe a method for obtaining a position of a pointer in accordance with an exemplary embodiment of the present invention. However, it should be noted that an operation method of the sensing system in this exemplary embodiment is different from that of the prior art.

In the present invention, information relative to a size of a pointer is firstly obtained to solve the problem of the conventional sensing technology which cannot calculate the coordinate value of the pointer when images partially overlap. Therefore, the sensing system of the present invention needs two operation modes, a first operation mode is configured for obtaining the relative information of the size of the pointer, and a second operation mode is configured for obtaining a coordinate value of the pointer. The following will firstly describe the first operation mode for obtaining the relative information.

Figure 2:
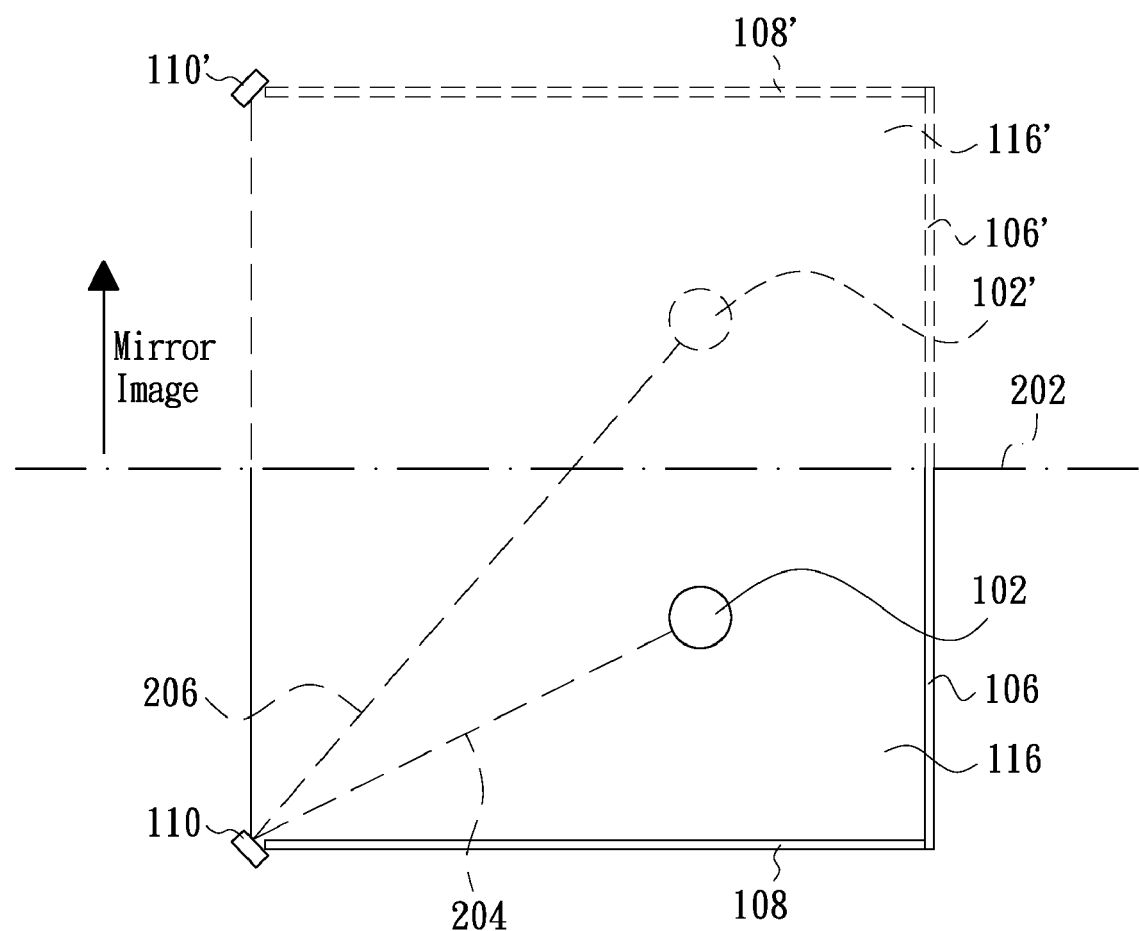
FIG. 2 is an explanatory view for describing an operation mode of the sensing system 100.
Figure 3:
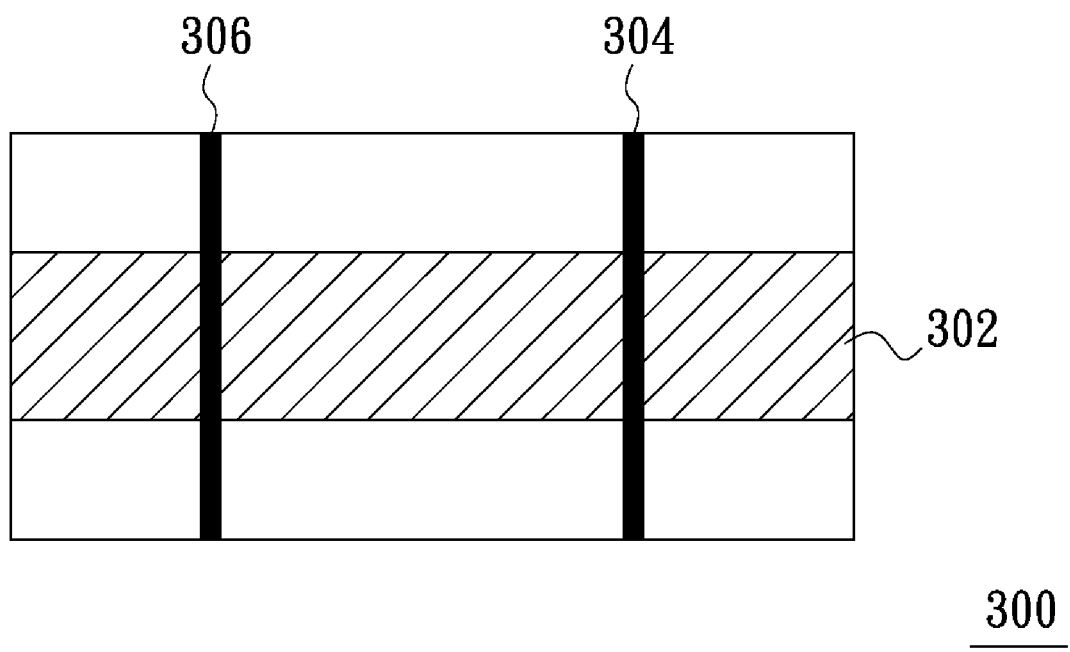
FIG. 3 is a schematic view of an image sensed by the image sensor 110 as shown in FIG. 2.

Referring to FIGS. 1 and 2 again, assuming that the sensing system 100 operates in the first operation mode at present and the pointer 102 is arranged perpendicularly on the sensing area 116, the pointer 102 will form an orthographic projection in the sensing area 116 by ambient light irradiating. The shape of the orthographic projection may be a shape indicated by a label 102 as shown in FIG. 2. In this exemplary embodiment, no matter which shape of the orthographic projection of the pointer 102 represents, the processing circuit 112 will regard the orthographic projection of the pointer 102 as a round projection. Since the processing circuit 112 regards the orthographic projection of the pointer 102 as the round projection, the processing circuit 112 may obtain the relative information of the size of the pointer according to steps as shown in FIG. 6, which are described in following.

Figure 6:
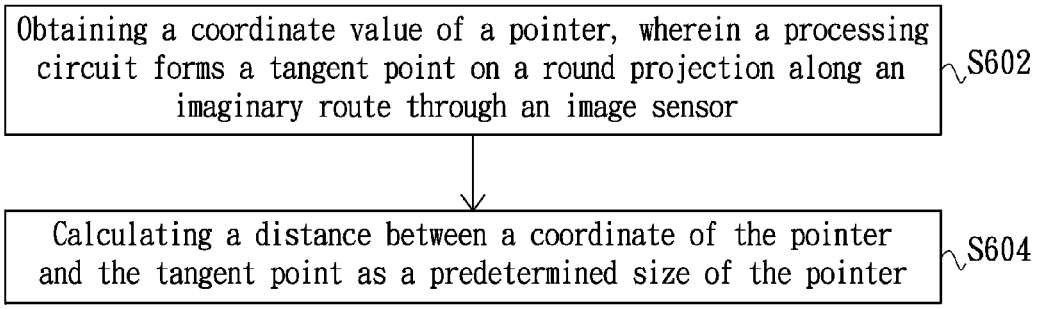
FIG. 6 is a flow chart for obtaining a predetermined size of a pointer in accordance with an exemplary embodiment of the present invention.
Figure 7:
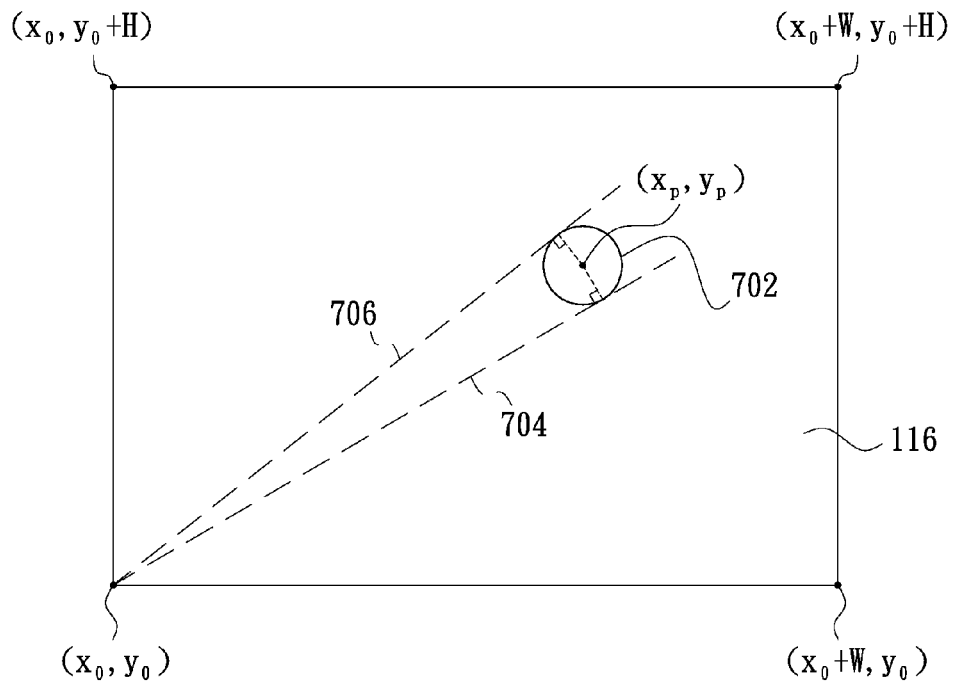
FIG. 7 is an explanatory view of a method for obtaining the predetermined size of the pointer.

FIG. 6 is a flow chart for obtaining a predetermined size of the pointer in accordance with an exemplary embodiment of the present invention, and FIG. 7 is an explanatory view of a method for obtaining the predetermined size of the pointer. Please refer to FIGS. 6 and 7. In FIG. 7, a label 702 represents the round projection, and an area indicated by a label 116 is the sensing area. Coordinates of four corner of the sensing area 116 are $(x_0, y_0)$, $(x_0, y_0+H)$, $(x_0+W, y_0)$ and $(x_0+W, y_0+H)$ respectively. The processing circuit 112 can employ the conventional method for sensing the position of the pointer, such as a calculating method disclosed in a TW Patent No. 097126033, to obtain the coordinate value of the pointer 102. In this exemplary embodiment, a coordinate of the pointer 102 is $(x_p, y_p)$, and the coordinate of the pointer 102 is same to a centre coordinate of the round projection 702. In other words, the centre coordinate of the round projection 702 is also $(x_p, y_p)$. At this moment, the processing circuit 112 also forms a tangent point on the round projection 702 along an imaginary route, such as an imaginary route 704, via the image sensor 110 (as shown in a step S602 of FIG. 6).

After performing the step S602, the processing circuit 112 can calculate a distance between the coordinate of the pointer 102 and the tangent point to be used as a predetermined size of the pointer 102 (as shown in a step S604 of FIG. 6). If the imaginary route 704 is represented by a linear equation $y=mx+b_1$, the processing circuit 112 can calculate according to a following equation (1):

$$\frac{|mx_p - y_p + b_1|}{\sqrt{m^2+1}} = r \quad (1)$$

Wherein, r is the distance between the coordinate of the pointer 102 and the tangent point, which is used as the predetermined size of the pointer 102. The predetermined size r is the relative information of the size of the pointer. Certainly, the present invention still can employ an imaginary route 706 to obtain the predetermined size r except employing the imaginary route 704 to obtain the predetermined size r. In addition, the present invention also can employ the imaginary routes 704 and 706 to obtain two values of the predetermined size, and then average the two values to obtain an accurate value of the predetermined size.

Figure 8:
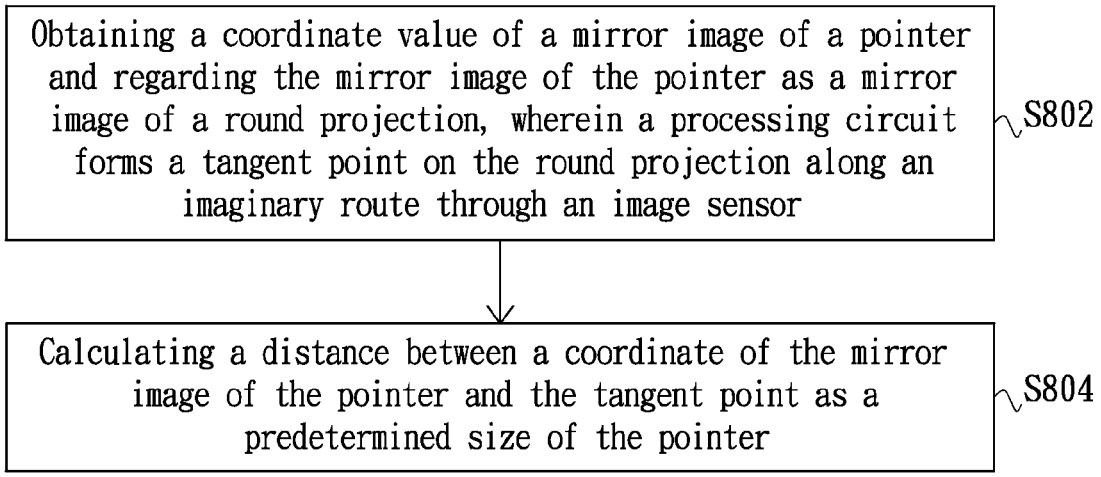
FIG. 8 is a flow chart for obtaining the predetermined size of the pointer in accordance with another exemplary embodiment of the present invention.

In addition, although the above exemplary embodiment employs the coordinate value of the pointer 102 to obtain the predetermined size of the pointer 102, the present invention also can employ a coordinate value of the mirror image 102' of the pointer 102 to obtain the predetermined size of the pointer 102, which is shown in FIG. 8. FIG. 8 is a flow chart for obtaining the predetermined size of the pointer in accordance with another exemplary embodiment of the present invention. In the flow chart of the FIG. 8, the coordinate value of the mirror image 102' of the pointer 102 is firstly obtained, and the mirror image 102' of the pointer 102 is regarded as the mirror image of the round projection 702. At this moment, the processing circuit 112 can form a tangent point on the mirror image of the round projection 702 along an imaginary route via the image sensor 110 (as shown in a step S802 of FIG. 8). Then, the processing circuit 102 can calculate the distance between a coordinate of the mirror image 102' of the pointer 102 and the tangent point to be used as a predetermined size of the pointer 102 (as shown in a step S804 of FIG. 8). It should be noted that the predetermined size of pointer 102 of the present invention may be a predetermined value, which is built-in the processing circuit 112.

Figure 4:
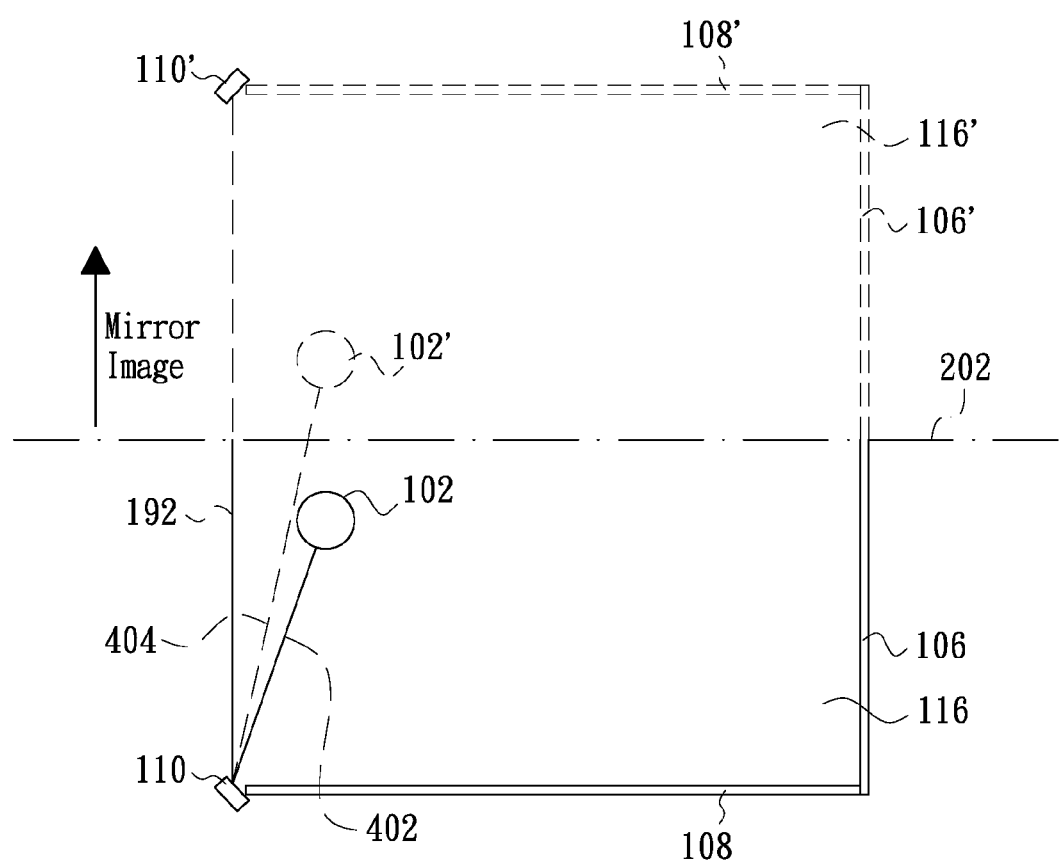
FIG. 4 is another explanatory view for describing an operation mode of the sensing system 100.
Figure 5:
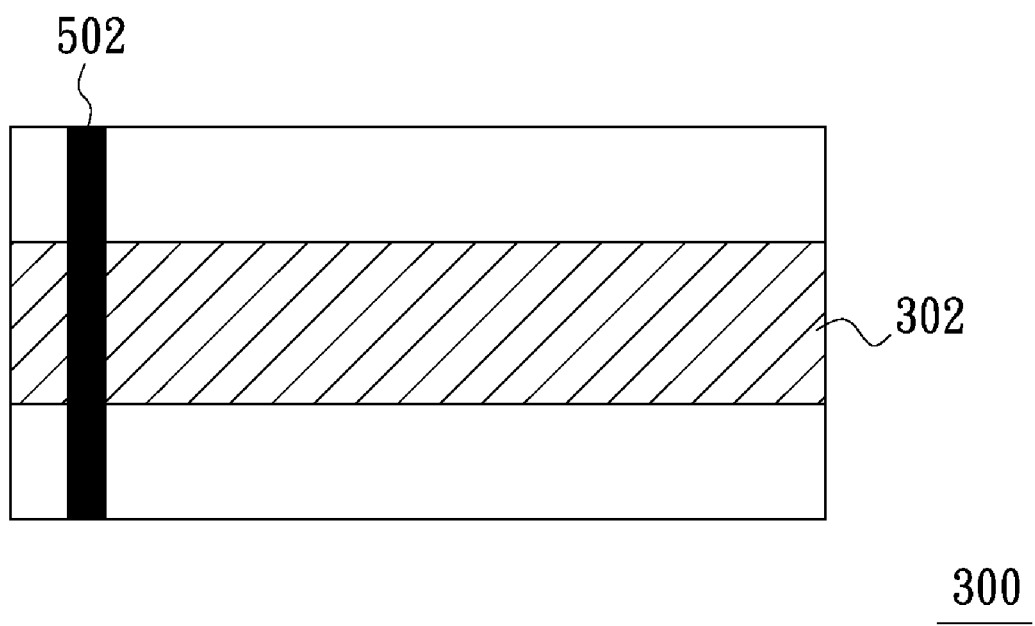
FIG. 5 is a schematic view of an image sensed by an image sensor 110 as shown in FIG. 4.
Figure 9:
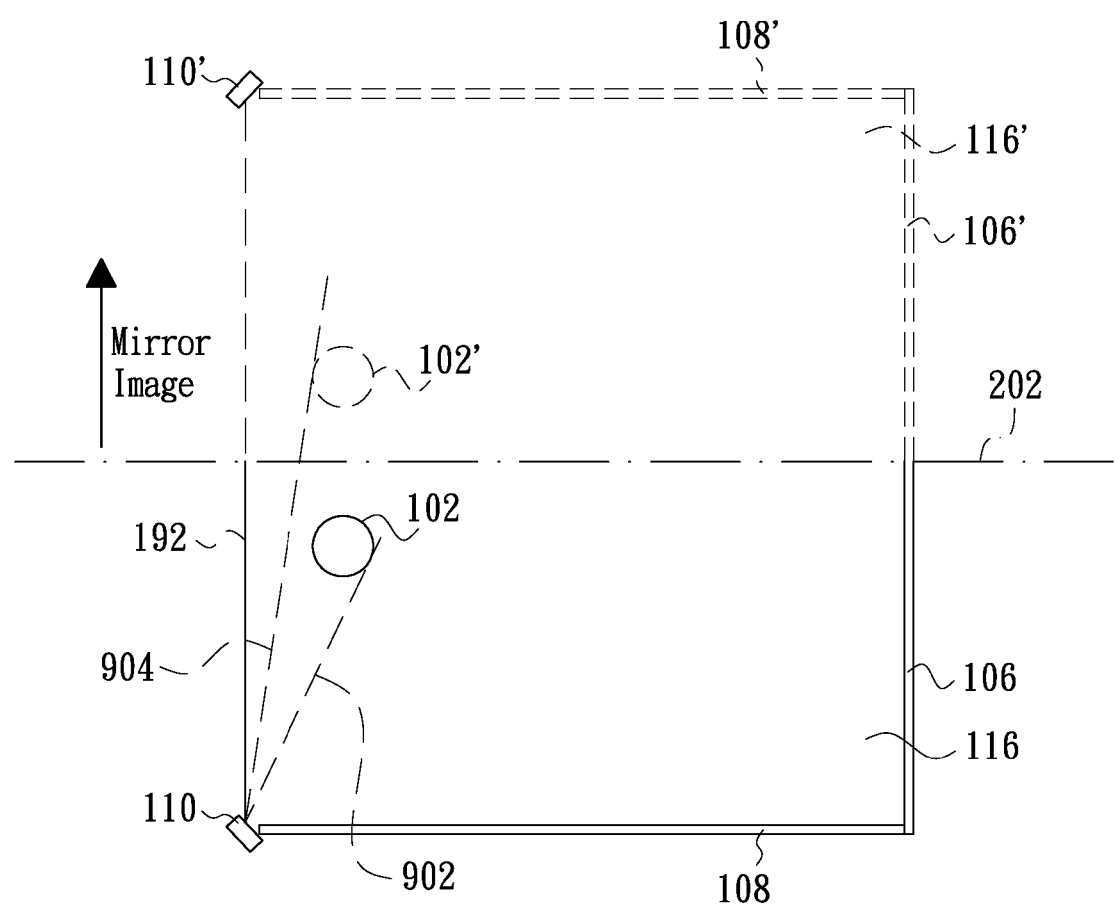
FIG. 9 is another explanatory view for describing an operation mode of the sensing system 100.

Please refer to FIG. 1 again. After obtaining the predetermined size r of the pointer 102, the sensing system 100 will operate in the second operation mode to sense the coordinate value of the pointer 102. In this operation mode, the processing circuit 112 will determine whether an image corresponding to the pointer 102 and an image corresponding to the mirror image 102' of the pointer 102 sensed by the image sensor 110 partially overlap. In other words, the processing circuit 112 will determine whether a condition similar with that as shown in FIG. 5 happens. When the processing circuit 112 determines that the images overlap partially, it represents the pointer 102 is too close to a periphery of the sensing area 116, which is shown in FIG. 9. FIG. 9 is another explanatory view of the operation mode of the sensing system 100. In FIG. 9, the labels same to those of FIG. 4 represent same objects, and they are not described in following. In this condition, the image sensor 110 still can sense the periphery of the pointer 102 along a sensing route 902, and can sense the periphery of the mirror image 102' of the pointer 102 along a sensing route 904. From FIG. 9 it can be seen that the pointer 102 and the mirror image 102' are between the sensing route 902 and the sensing route 904.

Figure 10:
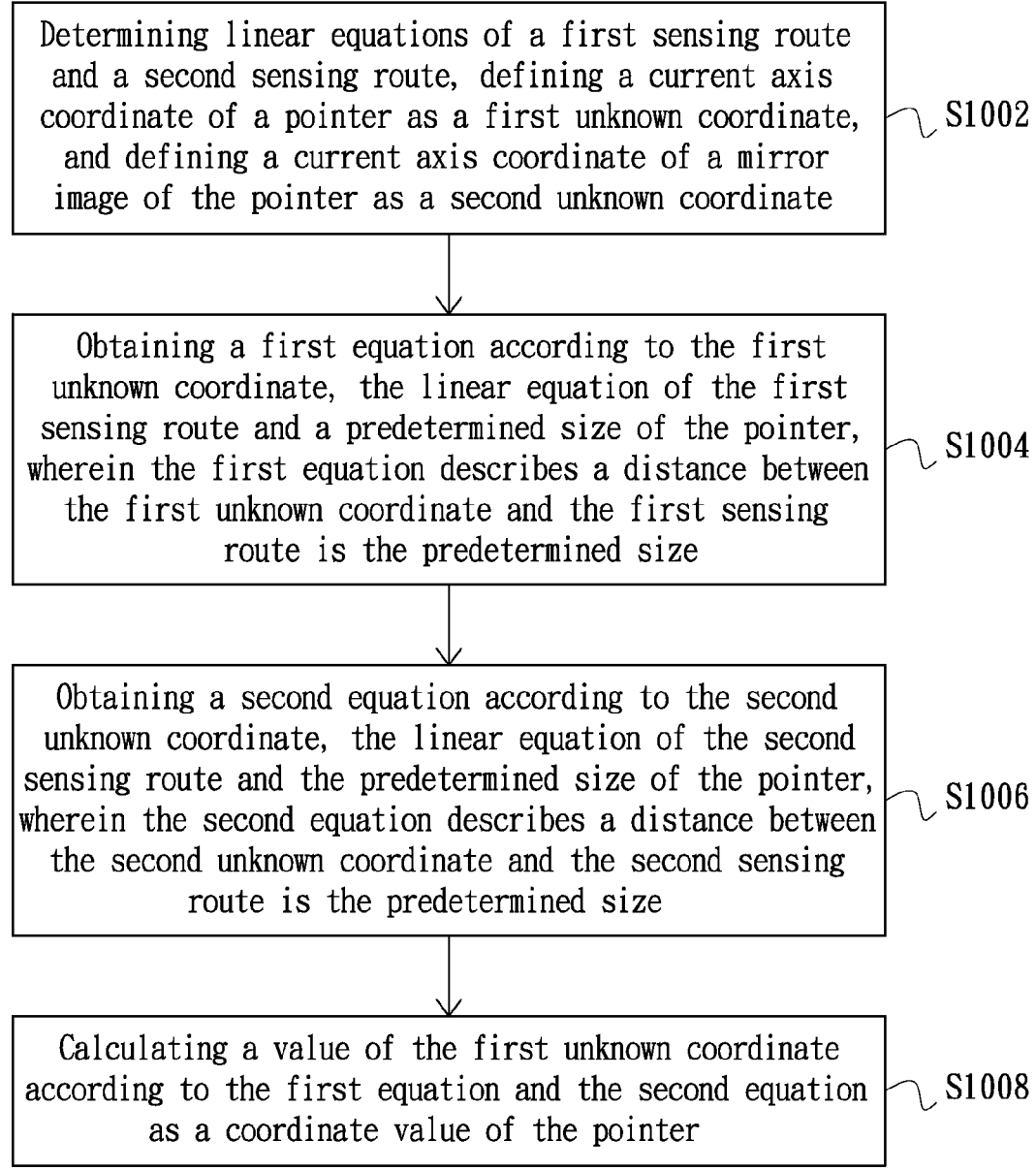
FIG. 10 is a flow chart for obtaining a coordinate value of the pointer in accordance with an exemplary embodiment of the present invention, which is adapted to a condition of images partially overlapping.
Figure 11:
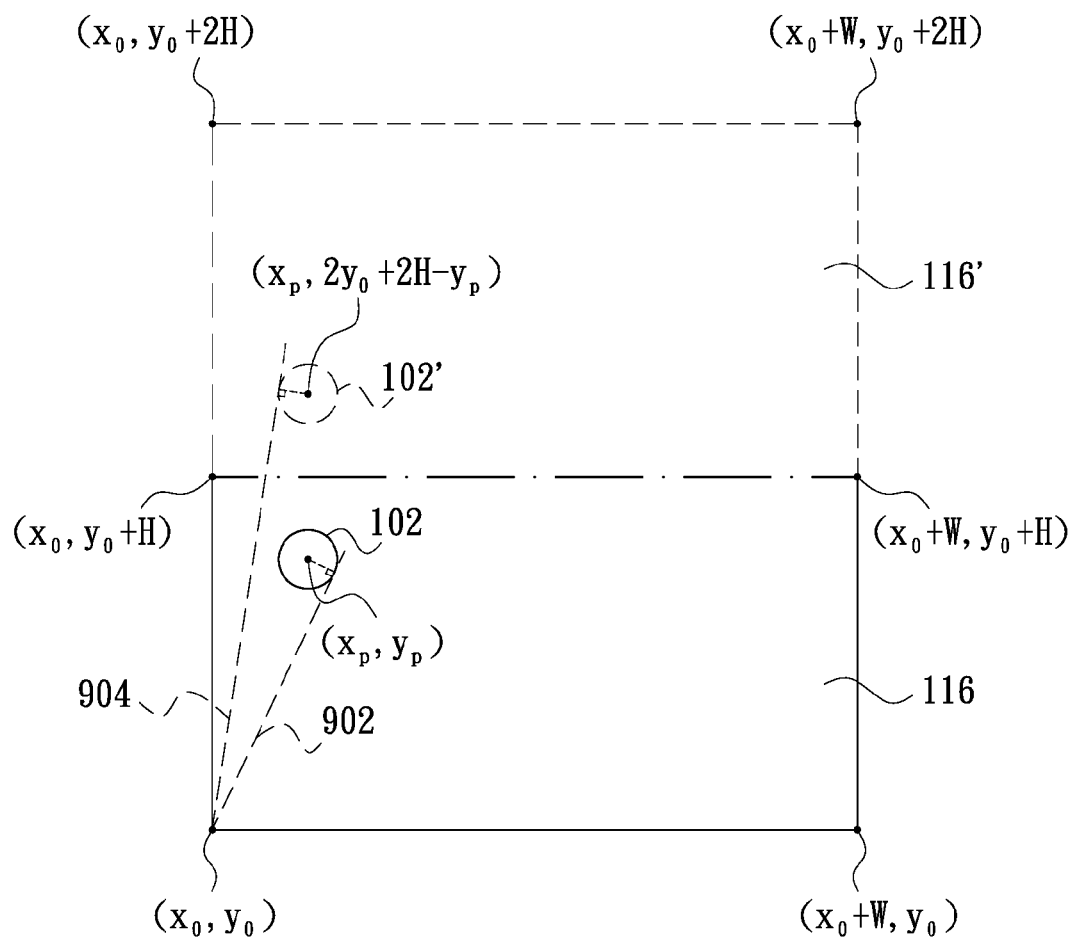
FIG. 11 is an explanatory view for obtaining the coordinate value of the pointer.

From the above description, it can be seen that in this condition the processing circuit 112 can operate in the mode as shown in FIG. 10. FIG. 10 is a flow chart for obtaining the coordinate value of the pointer in accordance with an exemplary embodiment of the present invention, which is adapted to a condition of the images overlapping partially, and FIG. 11 is an explanatory view for obtaining the coordinate value of the pointer. The following will firstly describe labels of FIG. 11. In FIG. 11, the label 102 represents the pointer, the label 102' represents the mirror image of the pointer, the area indicated by the label 116 represents the sensing area, and the area indicated by the label 116' represents the mirror image of the sensing area 116. Coordinates of four corners of the sensing area 116 are $(x_0, y_0)$, $(x_0, y_0+H)$, $(x_0+W, y_0)$ and $(x_0+W, y_0+H)$ respectively, and coordinates of four corners of the mirror image 116' of the sensing area 116 are $(x_0, y_0+H)$, $(x_0, y_0+2H)$, $(x_0+W, y_0+H)$ and $(x_0+W, y_0+2H)$ respectively. Furthermore, values of the above coordinates are known, and are recorded in the processing circuit 112.

Please refer to FIGS. 10 and 11. In the method as shown in FIG. 10, the processing circuit 112 firstly determines linear equations of the sensing routes 902 and 904, defines a current axes coordinate of the pointer 102 as an unknown coordinate $(x_p, y_p)$, and defines a current axes coordinate of the mirror image 102' of the pointer 102 as another unknown coordinate $(x_p, 2y_0+2H-y_p)$, which are shown in a step S1002 of FIG. 10. In this exemplary embodiment, the sensing route 902 can be represented by a linear equation of $y=m_R x+b_R$, and the sensing route 904 can be represented by a linear equation of $y=m'_L x+b'_L$. Then the processing circuit 112 can obtain a following equation (2) according to the unknown coordinate $(x_p, y_p)$, the linear equation of the sensing route 902 and the predetermined size r:

$$\frac{|m_R x_p - y_p + b_R|}{\sqrt{m_R^2+1}} = r \quad (2)$$

The equation (2) describes that the distance between the unknown coordinate $(x_p, y_p)$ and the sensing route 902 is the predetermined size r (as shown in a step S1004 of FIG. 10).

Then, the processing circuit 112 can obtain a following equation (3) according to the unknown coordinate $(x_p, 2y_0+2H-y_p)$, the linear equation of the sensing route 904 and the predetermined size r:

$$\frac{|m'_L x_p - (2y_0 + 2H - y_p) + b'_L|}{\sqrt{m'^2_L + 1}} = r \quad (3)$$

The equation (3) describes that the distance between the unknown coordinate $(x_p, 2y_0+2H-y_p)$ and the sensing route 904 is the predetermined size r (as shown in a step S1006 of FIG. 6). Therefore, the processing circuit 112 can calculate the value of the unknown coordinate $(x_p, y_p)$ according to the equations (1) and (2) as the coordinate value of the pointer 102. Furthermore, the calculating flow thereof can be represented by following two simultaneous equations and a final-obtained value of the coordinate $(x_p, y_p)$:

$$\begin{cases} |m_R x_p - y_p + b_R| = r\sqrt{m_R^2 + 1} \\ |m'_L x_p - (2y_0 + 2H - y_p) + b'_L| = r\sqrt{m'^2_L + 1} \end{cases}$$

$$\begin{cases} m_R x_p - y_p + b_R = -r\sqrt{m_R^2 + 1} \\ m'_L x_p - (2y_0 + 2H - y_p) + b'_L = r\sqrt{m'^2_L + 1} \end{cases}$$

$$(x_p, y_p) = \left( \frac{-r\sqrt{m_R^2 + 1} + r\sqrt{m'^2_L + 1} + (2y_0 + 2H) - b_R + b'_L}{m_R + m'_L}, \right.$$

$$\left. m_R x_p + b_R + r\sqrt{m_R^2 + 1} \right)$$

From the above it can be seen that, even if the condition similar with that of FIG. 5 happens, the sensing system 100 of the present invention still can calculate the coordinate value of the pointer 102, which solves the problem of the conventional sensing technology being not able to calculate the coordinate value of the pointer when the images overlap partially. It should be noted that, a performing sequence of the steps S1004 and S1006 of FIG. 10 is not limited.

Furthermore, in the second operation mode, when the processing circuit 112 determines the images do not partially overlap, the processing circuit 112 can employ the conventional method for sensing the position of the pointer, such as a calculating method disclosed in TW Patent No. 097126033, to obtain the coordinate value of the pointer 102. Certainly, the processing circuit 112 also can employ the above-obtained predetermined size r to calculate the coordinate value of the pointer 102, which is shown in FIG. 12.

Figure 12:
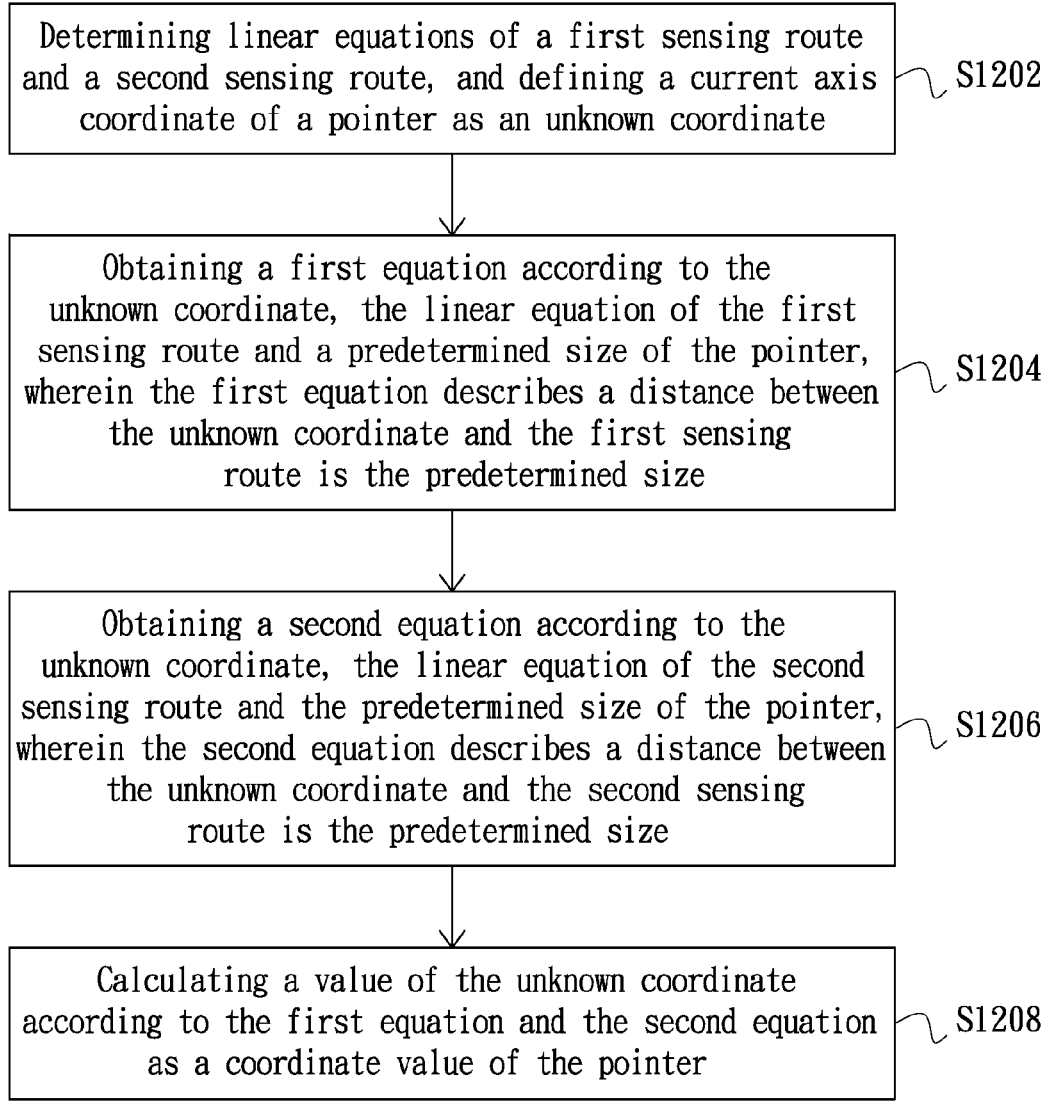
FIG. 12 is another flow chart for obtaining a coordinate value of a pointer in accordance with an exemplary embodiment of the present invention.
Figure 13:
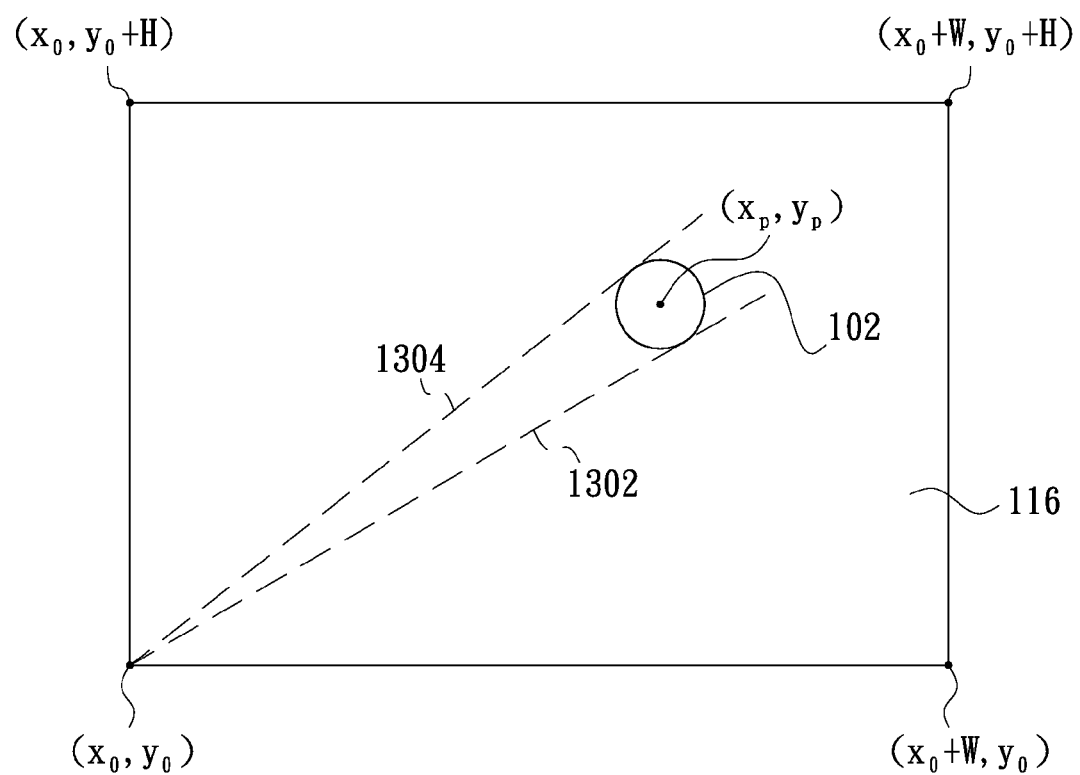
FIG. 13 is another explanatory view for obtaining the coordinate value of the pointer.

FIG. 12 is another flow chart for obtaining the coordinate value of the pointer in accordance with an exemplary embodiment of the present invention, and FIG. 13 is another explanatory view for obtaining the coordinate value of the pointer. Please refer to FIGS. 12 and 13 together. When the images do not partially overlap, the image sensor 110 can sense the periphery of the pointer 102 along sensing routes 1302 and 1304. As shown in FIG. 13, the pointer 102 is between the sensing routes 1302 and 1304. In the method as shown in FIG. 12, the processing circuit 112 firstly determines linear equations of the sensing routes 1302 and 1304, and defines a current axes coordinate of the pointer 102 as an unknown coordinate $(x_p, y_p)$, which is shown in a step S1202 of FIG. 12. In this exemplary embodiment, the linear equation of the sensing route 1302 is $y=m_R x+b_R$, and the linear equation of the sensing route 1304 is $y=m_L x+b_L$.

Then, the processing circuit 112 obtains the above equation (2) according to the unknown coordinate $(x_p, y_p)$, the linear equation of the sensing route 1302 and the predetermined size r, which is represented again in following:

$$\frac{|m_R x_p - y_p + b_R|}{\sqrt{m_R^2 + 1}} = r \quad (2)$$

The equation (2) is configured for describing that the distance between the unknown coordinate $(x_p, y_p)$ and the sensing route 1302 is the predetermined size r (as shown in a step S1204 of FIG. 12). Then, the processing circuit 112 obtains a following equation (4) according to the unknown equation $(x_p, y_p)$, the linear equation of the sensing route 1304 and the predetermined size r:

$$\frac{|m_L x_p - y_p + b_L|}{\sqrt{m_L^2 + 1}} = r \quad (4)$$

The equation (4) describes that the distance between the unknown coordinate $(x_p, y_p)$ and the sensing route 1304 is the predetermined size r (as shown in a step S1206 of FIG. 12). Therefore, the processing circuit 112 can calculate the value of the unknown coordinate $(x_p, y_p)$ according to the equations (2) and (4) as the coordinate value of the pointer 102 (as shown in a step S1208 of FIG. 12). The final-obtained value of the unknown coordinate $(x_p, y_p)$ is represented as the following:

$$(x_p, y_p) = \left( \frac{r\sqrt{m_R^2 + 1} + r\sqrt{m_L^2 + 1} + b_R - b_L}{m_L - m_R}, m_R x_p + b_R + r\sqrt{m_R^2 + 1} \right)$$

It should be noted that a performing sequence of the steps S1204 and S1206 of FIG. 12 is not limited.

Similarly, when the images do not partially overlap, the image sensor 110 can sensor the periphery of the mirror image 102' of the pointer 102 along the first sensing route and the second sensing route, and the mirror image 102' of the pointer 102 is between the first sensing route and the second sensing route. Thus the processing circuit 112 also can employ the above-obtained predetermined size r and the mirror image 102' of the pointer 102 to calculate the coordinate value of the pointer 102, and the operation mode thereof is as shown in FIG. 14.

Figure 14:
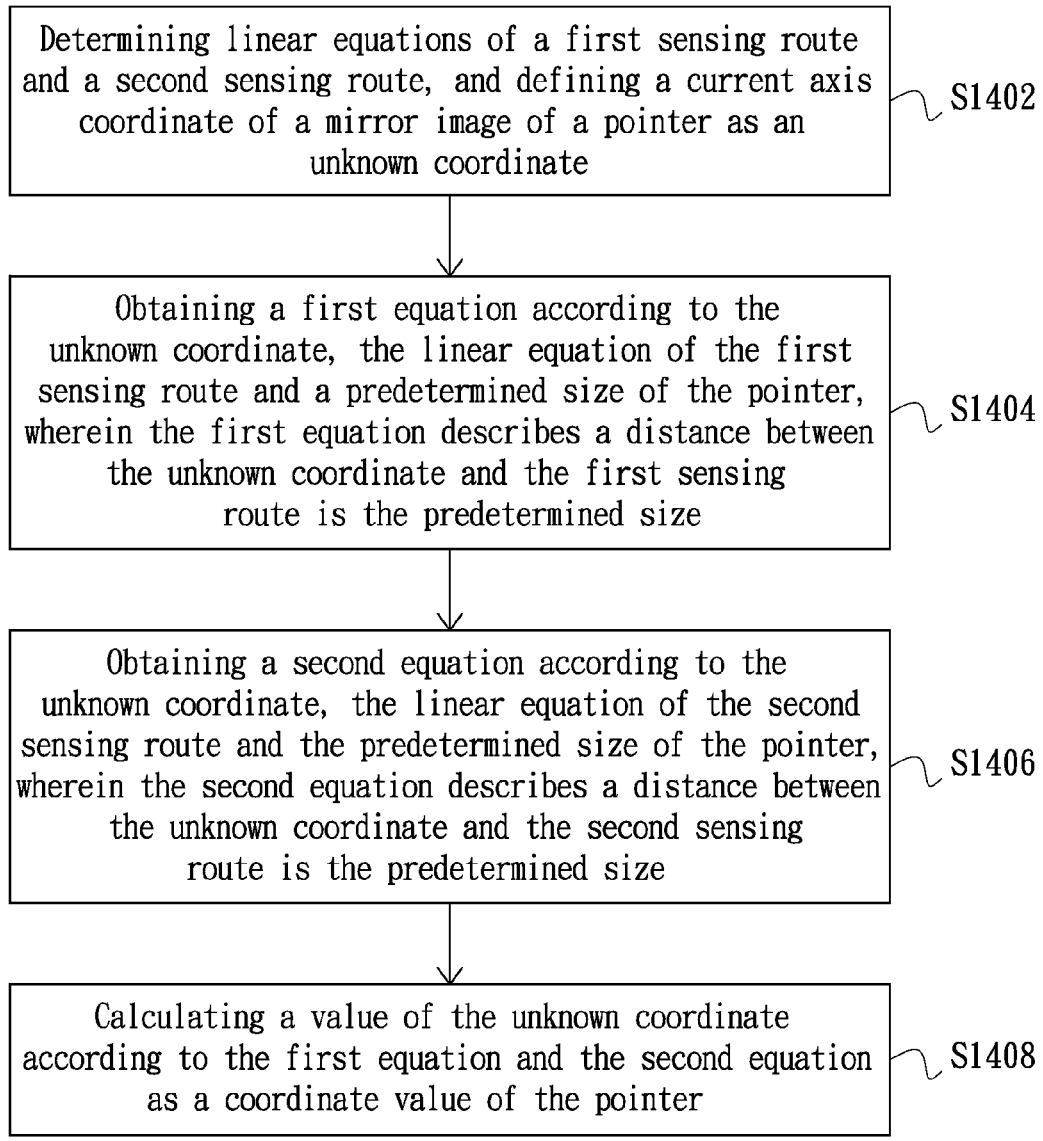
FIG. 14 is another flow chart for obtaining a coordinate value of a pointer in accordance with an exemplary embodiment of the present invention.

FIG. 14 is another flow chart for obtaining the coordinate value of the pointer in accordance with an exemplary embodiment of the present invention. In the method as shown in FIG. 14, linear equations of the first sensing route and the second sensing route are firstly determined, and a current axes coordinate of the mirror image 102' of the pointer 102 is defined as an unknown coordinate (as shown in a step S1402 of FIG. 14). Then, a first equation is obtained according to the unknown coordinate, the linear equation of the first sensing route and the predetermined size r, and the first equation describes that the distance between the unknown coordinate and the first sensing route is the predetermined size r (as shown in a step S1404 of FIG. 14). After that, a second equation is obtained according to the unknown coordinate, the linear equation of the second sensing route and the predetermined size r, and the second equation describes that the distance between the unknown coordinate and the second sensing route is the predetermined size r (as shown in a step S1406 of FIG. 14).

Finally, the value of the unknown coordinate is calculated according to the first equation and the second equation, so as to further calculate the coordinate value of the pointer 102 (as shown in a step S1408 of FIG. 14). In addition, it should be noted that a performing sequence of the steps S1404 and S1406 as shown in FIG. 14 is not limited.

Figure 15:
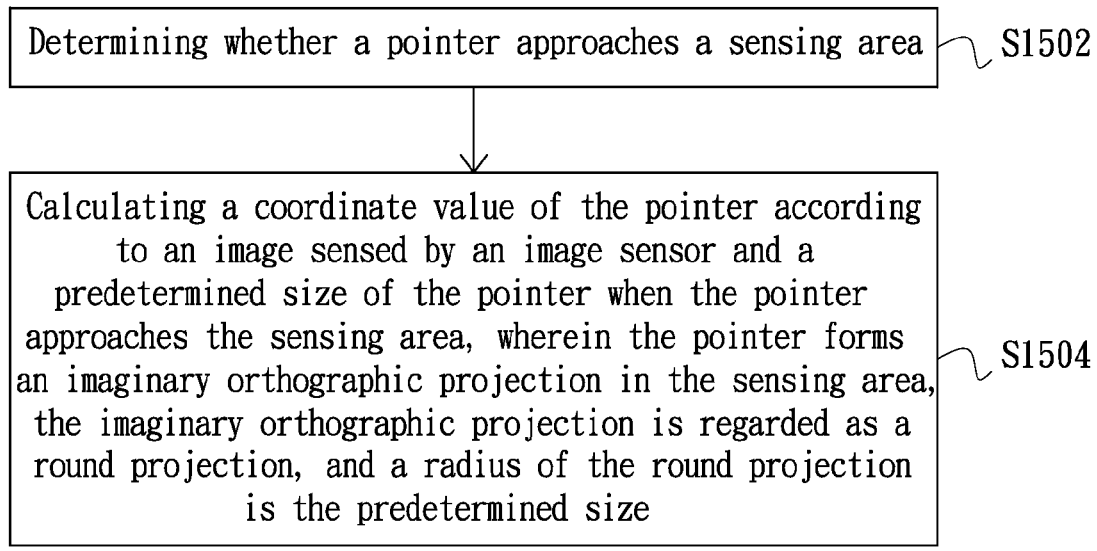
FIG. 15 a main operation flow chart for a sensing system obtaining a position of a pointer in accordance with an exemplary embodiment of the present invention.

FIG. 15 is main operation flow chart of a method for obtaining a position of a pointer by a sensing system in accordance with an exemplary embodiment of the present invention. The sensing system comprises a sensing area, a reflective mirror and an image sensor. The reflective mirror is configured for generating a mirror image of the pointer when the pointer approaches the sensing area. The image sensor is configured for sensing the pointer and the mirror image thereof when the pointer approaches the sensing area. In the method, whether the pointer approaches the sensing area is firstly determined (as shown in a step S1502 of FIG. 15). Then when determining the pointer approaches the sensing area, the coordinate value of the pointer is calculated according to the images sensed by the image sensor and a predetermined size of the pointer, wherein the pointer forms an imaginary orthographic projection in the sensing area, the imaginary orthographic projection is regarded as a round projection, and a radius of the round projection is the above predetermined size (as shown in a step S1504 of FIG. 15).

In summary, the present invention calculates the coordinate value of the pointer according to a predetermined size of the pointer when the images partially overlap. The predetermined size is a radius of a round projection by regarding an imaginary orthographic projection of the pointer formed in the sensing area as the round projection. In the present invention, if determining the linear equations of the first sensing route and the second sensing route, defining the current axes coordinate of the pointer as a first unknown coordinate and defining the current axes coordinate of the mirror image of the pointer as a second unknown coordinate can be performed, a first equation can be obtained according to the first unknown coordinate, the linear equation of the first sensing route and the predetermined size, and a second equation can also be obtained according to the second unknown coordinate, the linear equation of the second sensing route and the predetermined size. The first equation describes that the distance between the first unknown coordinate and the first sensing route is the predetermined size, and the second equation describes that the distance between the second unknown coordinate and the second sensing route is the predetermined size. Then the value of the first known coordinate can be calculated according to the first equation and the second equation as the coordinate value of the pointer. Therefore, the present invention can solve the problem of the conventional sensing technology which can not calculate the coordinate value of the pointer when the images partially overlap.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A sensing system, comprising:
a sensing area;
a reflective mirror configured for generating a mirror image of a pointer when the pointer approaches the sensing area;
an image sensor configured for sensing the pointer and the mirror image thereof when the pointer approaches the sensing area; and
a processing circuit, when the pointer approaches the sensing area, the processing circuit calculating a coordinate value of the pointer according to the image sensed by the image sensor and a predetermined size of the pointer, wherein the pointer forms an imaginary orthographic projection in the sensing area, the processing circuit regards the imaginary orthographic projection as a round projection, and a radius of the round projection is the predetermined size.

2. The sensing system as claimed in claim 1, wherein when an image corresponding to the pointer and an image corresponding to the mirror image of the pointer sensed by the image sensor partially overlap, the image sensor senses a periphery of the pointer along a first sensing route, and the image sensor senses a periphery of the mirror image of the pointer along a second sensing route, the pointer and the mirror image thereof are between the first sensing route and the second sensing route, the processing circuit determines linear equations of the first sensing route and the second sensing route, defines a current axes coordinate of the pointer as a first unknown coordinate and defines a current axes coordinate of the mirror image of the pointer as a second unknown coordinate, the processing circuit also obtains a first equation according to the first unknown coordinate, the linear equation of the first sensing route and the predetermined size, and obtains a second equation according to the second unknown coordinate, the linear equation of the second sensing route and the predetermined size to calculate a value of the first unknown coordinate according to the first equation and the second equation as the coordinate value of the pointer, the first equation describes that a distance between the first unknown coordinate and the first sensing route is the predetermined size, and the second equation describes that a distance between the second unknown coordinate and the second sensing route is the predetermined size.

3. The sensing system as claimed in claim 1, wherein when an image corresponding to the pointer and an image corresponding to the mirror image of the pointer sensed by the image sensor do not partially overlap, the image sensor senses a periphery of the pointer along a first sensing route and a second sensing route, the pointer is between the first sensing route and the second sensing route, the processing circuit determines linear equations of the first sensing route and the second sensing route and defines a current axes coordinate of the pointer as an unknown coordinate, the processing circuit also obtains a first equation according to the unknown coordinate, the linear equation of the first sensing route and the predetermined size, and obtains a second equation according to the unknown coordinate, the linear equation of the second sensing route and the predetermined size to calculate a value of the unknown coordinate according to the first equation and the second equation as the coordinate value of the pointer, the first equation describes that a distance between the unknown coordinate and the first sensing route is the predetermined size, and the second equation describes that a distance between the unknown coordinate and the second sensing route is the predetermined size.

4. The sensing system as claimed in claim 1, wherein when an image corresponding to the pointer and an image corresponding to the mirror image of the pointer sensed by the image sensor do not overlap, the image sensor senses a periphery of the mirror image of the pointer along a first sensing route and a second sensing route, the mirror image of the pointer is between the first sensing route and the second sensing route, the processing circuit determines linear equations of the first sensing route and the second sensing route, and defines a current axes coordinate of the mirror image of the pointer as an unknown coordinate, the processing circuit further obtains a first equation according to the unknown equation, the linear equation of the first sensing route and the predetermined size, and obtains a second equation according to the unknown equation, the linear equation of the second sensing route and the predetermined size to calculate a value of the unknown coordinate according to the first equation and the second equation as the coordinate value of the pointer, the first equation describes that a distance between the unknown coordinate and the first sensing route is the predetermined size, and the second equation describes that a distance between the unknown coordinate and the second sensing route is the predetermined size.

5. The sensing system as claimed in claim 1, wherein the step of the processing circuit obtaining the predetermined size is firstly obtaining the coordinate value of the pointer, at this moment, the processing circuit forms a tangent point on the round projection along an imaginary route through the image sensor, then the processing circuit calculates a distance between a coordinate of the pointer and the tangent point as the predetermined size.

6. The sensing system as claimed in claim 1, wherein the step of the processing circuit obtaining the predetermined size is firstly obtaining the coordinate value of the mirror image of the pointer, and regarding the mirror image of the pointer as an mirror image of the round projection, at this moment, the processing circuit forms a tangent point on the mirror image of the round projection along an imaginary route through the image sensor, then the processing circuit calculates a distance between a coordinate of the mirror image of the pointer and the tangent point as the predetermined size.

7. A method for obtaining a position of a pointer, adapted to a sensing system, the sensing system comprising a sensing area, a reflective mirror and an image sensor, the reflective mirror being configured for generating a mirror image of the pointer when the pointer approaches the sensing area, the image sensor being configured for sensing the pointer and the mirror image thereof when the pointer approaches the sensing area, the method comprising:
  determining whether the pointer approaches the sensing area; and
  when determining the pointer approaches the sensing area, calculating a coordinate value of the pointer according to an image sensed by the image sensor and a predetermined size of the pointer,
  wherein the pointer forms an imaginary orthographic projection in the sensing area, the imaginary orthographic projection is regarded as a round projection, and a radius of the round projection is the predetermined size.

8. The method as claimed in claim 7, wherein when an image corresponding to the pointer and an image corresponding to the mirror image of the pointer sensed by the image sensor partially overlap, the image sensor senses a periphery of the pointer along a first sensing route, and the image sensor senses a periphery of the mirror image of the pointer along a second sensing route, the pointer and the mirror image thereof are between the first sensing route and the second sensing route, the step of calculating the coordinate value of the pointer comprises:
  determining linear equations of the first sensing route and the second sensing route, defining a current axes coordinate of the pointer as a first unknown coordinate, and defining a current axes coordinate of the mirror image of the pointer as a second unknown coordinate;
  obtaining a first equation according to the first unknown coordinate, the linear equation of the first sensing route and the predetermined size, wherein the first equation describes that a distance between the first unknown coordinate and the first sensing route is the predetermined size;
  obtaining a second equation according to the second unknown coordinate, the linear equation of the second sensing route and the predetermined size, wherein the second equation describes that a distance between the second unknown coordinate and the second sensing route is the predetermined size; and
  calculating a value of the first unknown coordinate according to the first equation and the second equation as the coordinate value of the pointer.

9. The method as claimed in claim 7, wherein when an image corresponding to the pointer and an image corresponding to the mirror image of the pointer sensed by the image sensor do not overlap, the image sensor senses a periphery of the pointer along a first sensing route and a second sensing route, the pointer is between the first sensing route and the second sensing route, the step of calculating the coordinate value of the pointer comprise:
  determining linear equations of the first sensing route and the second sensing route, and defining a current axes coordinate of the pointer as an unknown coordinate;
  obtaining a first equation according to the unknown coordinate, the linear equation of the first sensing route and the predetermined size, wherein the first equation describes that a distance between the unknown coordinate and the first sensing route is the predetermined size;
  obtaining a second equation according to the unknown coordinate, the linear equation of the second sensing route and the predetermined size, wherein the second equation describes that a distance between the unknown coordinate and the second sensing route is the predetermined size; and
  calculating a value of the unknown coordinate according to the first equation and the second equation as the coordinate value of the pointer.

10. The method as claimed in claim 7, wherein when an image corresponding to the pointer and an image corresponding to the mirror image of the pointer sensed by the image sensor do not overlap, the image sensor senses a periphery of the mirror image of the pointer along a first sensing route and a second sensing route, the mirror image of the pointer is between the first sensing route and the second sensing route, and the step of calculating the coordinate value of the pointer comprises:
  determining linear equations of the first sensing route and the second sensing route, and defining a current axes coordinate of the mirror image of the pointer as an unknown coordinate;
  obtaining a first equation according to the unknown coordinate, the linear equation of the first sensing route and the predetermined size, wherein the first equation describes that a distance between the unknown coordinate and the first sensing route is the predetermined size;
  obtaining a second equation according to the unknown coordinate, the linear equation of the second sensing route and the predetermined size, wherein the second equation describes that a distance between the unknown coordinate and the second sensing route is the predetermined size; and calculating a value of the unknown coordinate according to the first equation and the second equation to further calculate the coordinate value of the pointer.

11. The method as claimed in claim 7, wherein the sensing system further comprises a processing circuit, and the step of obtaining the predetermined size comprises:

obtaining the coordinate value of the pointer, wherein at this moment, the processing circuit forms a tangent point on the round projection along an imaginary route through the image sensor; and calculating a distance between a coordinate of the pointer and the tangent point as the predetermined size.

12. The method as claimed in claim 7, wherein the sensing system further comprises a processing circuit, and the step of obtaining the predetermined size comprises:

obtaining the coordinate value of the mirror image of the pointer and regarding the mirror image of the pointer as a mirror image of the round projection, wherein at this moment, the processing circuit forms a tangent point on the mirror image of the round projection along an imaginary route through the image sensor; and calculating a distance between a coordinate of the mirror image of the pointer and the tangent point as the predetermined size.

* * * * *